Figure 1:
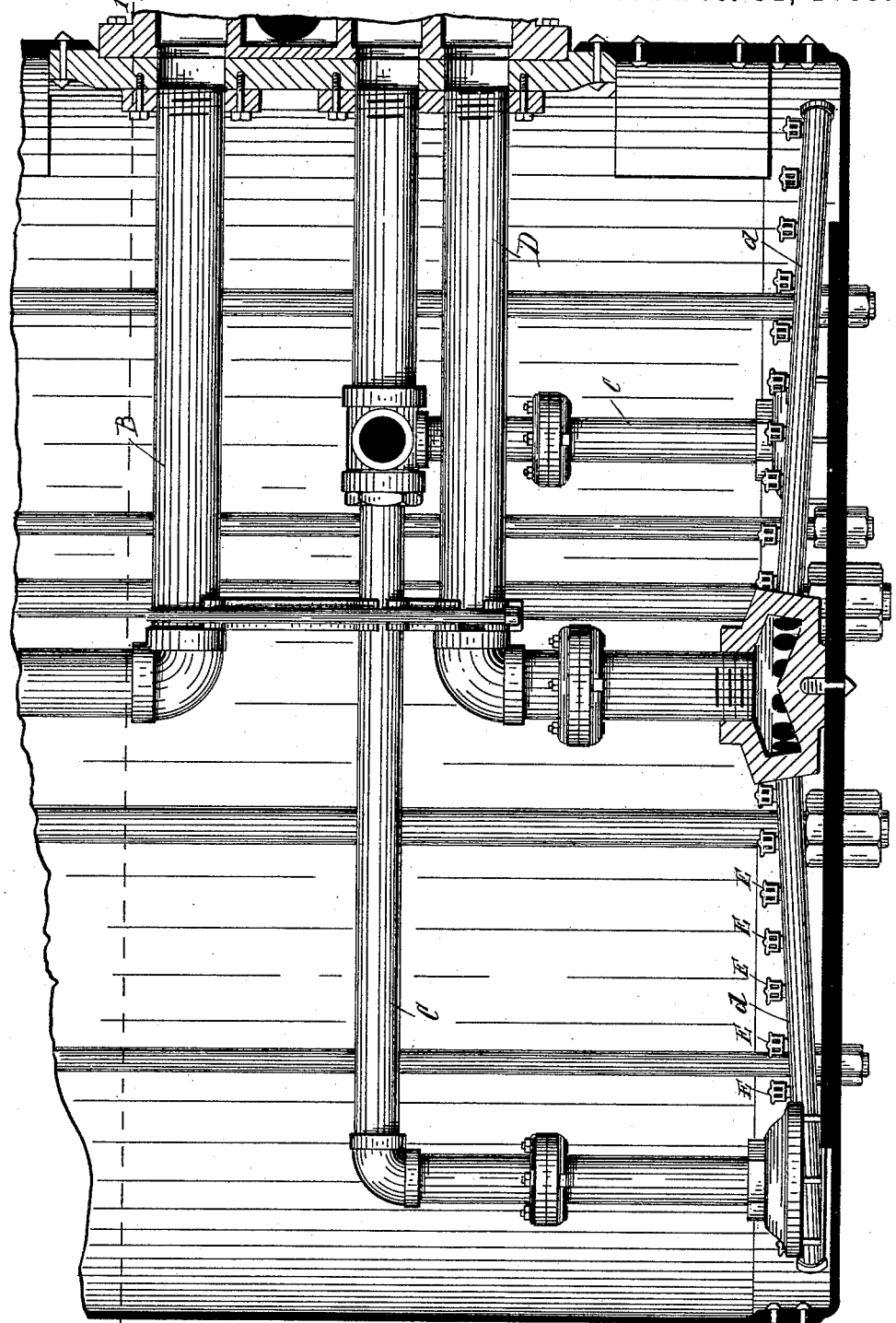

(No Model.)  2 Sheets—Sheet 1.
O. H. JEWELL.
CHECK VALVE FOR WATER FILTERS, &c.

No. 418,335. Patented Dec. 31, 1889.

Witnesses
Watson Hurlburt
A. M. Best

Inventor
Omar H. Jewell
By Coburn & Thacher
Atty

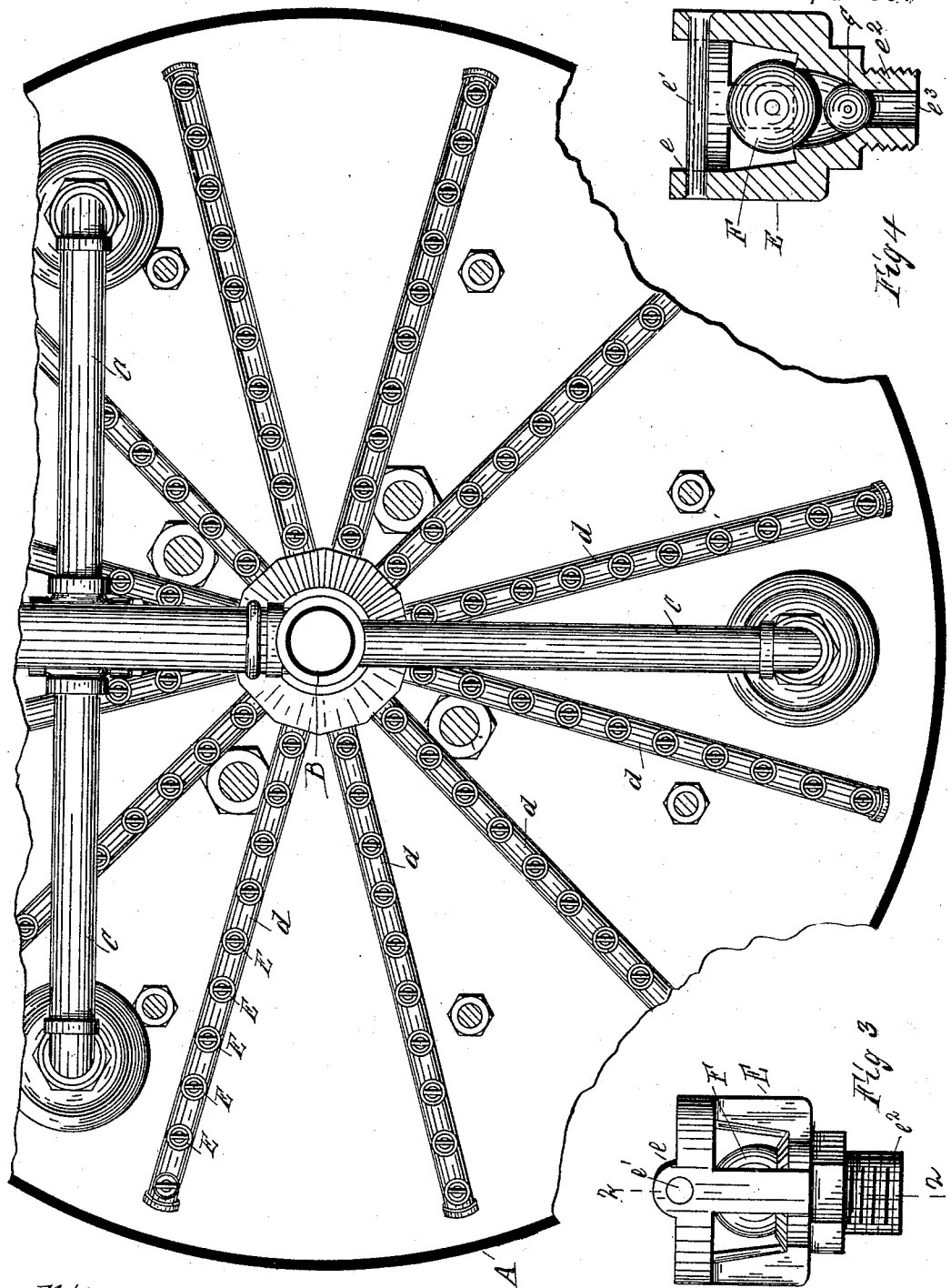

# UNITED STATES PATENT OFFICE.

OMAR H. JEWELL, OF CHICAGO, ILLINOIS, ASSIGNOR TO THE JEWELL PURE WATER COMPANY, OF SAME PLACE.

CHECK-VALVE FOR WATER-FILTERS, &c.

SPECIFICATION forming part of Letters Patent No. 418,335, dated December 31, 1889.

Application filed April 19, 1889. Serial No. 307,861. (No model.)

*To all whom it may concern:*

Be it known that I, OMAR H. JEWELL, a citizen of the United States, residing at Chicago, in the county of Cook and State of Illinois, have invented certain new and useful Improvements in Check-Valves for Water-Filters, &c., which is fully set forth in the following specification, reference being had to the accompanying drawings, in which—

Figure 1 represents a vertical section of the lower part of a water-filter, the upper portion being entirely broken away; Fig. 2, a plan section of the same, taken on the line 1 1 of Fig. 1; Fig. 3, an elevation of one of the check-valves detached and on an enlarged scale; and Fig. 4, a section of the same, taken on the line 2 2 of Fig. 3.

My present invention relates to an improvement in check-valves intended for use in water-filters and other structures wherever the improvement may be applicable.

It consists, essentially, in a double ball-valve, the two balls being arranged one above the other and the lower one smaller than the upper one, whereby an improved action of the valve is obtained.

I will proceed to describe one way in which I have carried out my invention in actual use, and will then point out definitely in claims the particular improvements which I believe to be new and wish to secure by Letters Patent.

In the drawings I have shown the invention applied to a water-filter designed to filter a large volume of water, but I have shown only so much of the structure as is desirable for an understanding of the present invention and its application, for the general structure of the filter is no part of my present improvement.

In the drawings, A represents the filter-tank; B, the inlet-pipe, which supplies water to the tank above the filter-bed; C, the outlet-pipe, through which the purified water collected at the bottom of the tank is discharged; and D, the wash-pipe, through which water is discharged into the tank at the bottom thereof for the purpose of washing the filter-bed as it is forced up through the latter. This wash-pipe terminates in branches $d$, which radiate from the lower end of the pipe extending along the bottom of the tank in all directions. Now, as the bed of filtering material lies immediately above and around these branch pipes, it is obvious that the openings in the latter through which water is discharged for washing the filter must be carefully protected to prevent the escape of material from the filter-bed into the pipes when the water is shut off. To effect this result, check-valves are placed in the discharge-openings in the several pipes; but I have found that check-valves of any ordinary construction are not entirely satisfactory in operation, as their action is not satisfactory to prevent the passage of small quantities of sand or other like material from the filter-bed into the pipes before the valve is fully closed. I have therefore devised an improvement in these valves for the purpose of obviating this difficulty.

In Fig. 3 of the drawings the general structure of this valve is illustrated. It is of the ball type and consists of a main body E, the upper portion $e$ of which is a kind of skeleton cage adapted to receive and retain the valve-balls. A pin or rod $e'$ extends across the top of the cage from side to side, which is intended to prevent the valve-balls being forced out through the top of the cage. At the lower end of this body E there is a stem $e^2$, which is threaded externally to provide for securing the valve to the pipes, the openings in which are correspondingly threaded. A passage or duct $e^3$ is made through the stem and central portion of the support, the upper portion of which duct is enlarged, so as to provide a flaring mouth or outlet, as shown in Fig. 4 of the drawings. Two balls are applied to this opening—one F somewhat larger than the mouth of the passage, within which it is properly seated, and the other G considerably smaller than this flaring mouth, but larger than the lower portion of the duct, so that this smaller ball will be seated within the flaring outlet and just at the upper end of the straight passage through the valve-stem, as seen in Fig. 4 of the drawings. I thus provide a two-ball valve, which operates upon the same general principle of any ordinary ball-valve, except that the closing device is double and its efficiency thereby increased. When water or any other liquid is forced up through the valves, both balls are raised to permit the upward flow of the liquid, as in any ball-valve. In practical experience I have found, however, that with valves of any known construction there will be a slight escape of fine sand, during the process of washing the filter, down past the valve. This I have found to be the case with the cone-valve which I have heretofore used, this escape of sand often filling up the cone below the seat of the closing-disk, and I have also found that the operation is the same with a single-ball valve; but I have found from actual and continued use of a valve constructed with the two balls of unequal size, as described above, that this difficulty is entirely obviated, and no material escapes down past the valve in the operation of washing my filters. I think the reason for this result is that the escape of the filtering material past the valve is produced by a slight creeping of the fine sand over the edge of the seat and down the inside, and I believe that in the use of the two balls, as described, the lower and smaller one is kept in constant motion around the small conical space below the large ball by the force of the escaping water, and so stirs up the silt which has crept down into this space, thus mixing it with the water passing up through the space, so that it is carried out, and thus the valve kept constantly clean. The precise action of the smaller ball cannot be determined positively, as it cannot be seen in the interior of the valve-body; but I believe that it is as stated above, and I know that its action is practically perfect in preventing the escape of any material from above, while a single ball in the valve has been found by actual use to be defective in its operation, as stated above.

As shown in the drawings, these valves are applied to the radial arms branching out from the lower end of the wash-pipe at the bottom of the filter-tank, being screwed into openings along the upper side of these arms, as shown in Fig. 2 of the drawings. In this application of the valve, when it is desired to wash the filter-bed, water is turned on through the wash-pipe and discharged at the bottom of the filter-bed up through the said valves. When the washing is completed and the discharge of water through the wash-pipe is cut off, the action of the valve-balls described above is very efficient to prevent the escape of any of the filtering material into the wash-pipes, such small quantities of fine gravel as may escape past the larger ball being mixed with the water in the cup-shaped opening between the two (seen in Fig. 4 of the drawings) by the movement of the smaller ball, as described, from which it will be driven out again at the top of the valve by the water escaping therefrom.

I do not wish to be understood as limiting my invention to its use in water-filters as herein shown and described. I have shown the application of the valve to water-filters simply for the purpose of illustrating its application and operation; but I wish to be understood as claiming this improvement to any and all structures to which it may be applicable; and I do not wish to be understood as limiting myself to the particular details of construction as herein set forth and shown, for in different applications these may be varied, the gist of my invention being the two balls arranged substantially as described.

Having thus described my invention, what I claim as new, and desire to secure by Letters Patent, is—

1. In check-valves, a supporting-body having a passage extending through it with a flaring or conical mouth, in combination with two valve-balls of unequal size, both seated in the flaring mouth of the passage and the smaller one arranged immediately below the larger, substantially as and for the purposes specified.

2. A check-valve consisting of a body E, provided with a retaining-cage e and a duct extending through it and flaring at its upper end, and two valve-balls of unequal size arranged and seated in the flaring mouth of the duct, as described, substantially as and for the purposes specified.

OMAR H. JEWELL.

Witnesses:
CARRIE FEIGEL,
ABBIE M. BEST.